Patented Jan. 3, 1933

1,893,152

UNITED STATES PATENT OFFICE

ALFRED SCHULTZ AND CHARLES N. FREY, OF NEW YORK, N. Y., ASSIGNORS TO STANDARD BRANDS INCORPORATED, OF NEW YORK, N. Y., A CORPORATION OF DELAWARE

MANUFACTURE OF YEAST

No Drawing.    Application filed March 3, 1931. Serial No. 519,892.

This invention relates to a non-zymatic yeast, and to method of producing the same.

An object of the invention is to provide yeast having depressed zymatic activity, but otherwise having the appearance and characteristics of ordinary compressed yeast.

Another object of the invention is to provide a novel method of producing substantially non-zymatic live yeast which is capable of growing and reproducing itself without voluminous formation of carbon dioxide.

Other objects of the invention will in part be obvious and will in part appear hereinafter.

The invention accordingly comprises the several steps and the relation and order of one or more of such steps with respect to each of the others thereof, which will be exemplified in the method hereinafter disclosed, and the scope of the application of which will be indicated in the claims.

Compressed yeast, such as is sold, for example, in the ordinary foil yeast cake, is composed of millions of small cells which are in a live state and which, when used in bread making or admixed with sugar in a not too high concentration, act enzymatically on the sugar present to form carbon dioxide and, incidentally, alcohol. In bread making this formation of carbon dioxide constitutes the reason for using the yeast, in that it leavens the bread, but in candy making and certain other known uses of yeast, such gas formation is undesirable.

We have now found that by growing yeast in the presence of ethylene chlorohydrin, the yeast produced has normal color, odor and taste; it presses readily and from all external appearances is normal in every respect; but when it is placed in bread dough, candy or even in a culture solution, it forms substantially no gas.

Such a yeast may be grown by any type of propagation process and on any type of nutrient solution as, for example, in a continuous or fractional addition process with a solution of cane and/or beet molasses and appropriate amounts of ammonium phosphate, ammonium sulphate and ammonia, the solution being aerated and the ammonia and other nutrients being added from time to time as required to control the acidity of and the supply of nutrients in the propagating liquid. The amount of ethylene chlorohydrin to be used depends upon the amount of seed yeast used and the number of multiplications thereof, the amount being larger the smaller the number of multiplications. For example, with a total propagating liquid of about 6 liters, about 60 grams of seed yeast and a final product of about 360 grams of new yeast, about 0.6 cc. of ethylene chlorohydrin is required; the rule in general being that for the number of generations normally encountered in yeast manufacturing processes, about .01% to .03% of ethylene chlorohydrin is required. The ethylene chlorohydrin is added preferably at the beginning of, or before the start of the propagation.

A striking thing about this phenomenon is that the treatment of yeast per se with ethylene chlorohydrin, as, for example, by the addition of ethylene chlorohydrin to cream yeast (separated yeast), is not effective in suppressing the zymatic activity unless the concentration thereof is raised to a point which is both impractical from the standpoint of cost and which affects the quality of the yeast other than in the respect of suppressing the zymatic activity.

Another striking thing is that if a yeast, prepared as above described and having substantially no zymatic activity, is grown in a succeeding propagation without the addition of ethylene chlorohydrin, the yeast product obtained will be normal in yield and will have a normal fermenting capacity or zymatic activity; indicating that the zymase may be gradually regenerated through the succeeding fermentation. Also in such succeeding propagation process, because the seed yeast is initially of non-zymatic character, there is a smaller formation of carbon dioxide (which is a waste by-product of yeast manufacture), and hence the yield on the sugar material may be increased by the use of such non-zymatic yeast as stock or seed yeast. The minimized formation of carbon dioxide also permits the use of lower aeration than is used in processes where zymatically active yeast is used for seed.

The non-zymatic yeast, comprising the present invention, will be useful for admixing with solutions such as malted milk, syrups, fruits, ice cream, candy and various other food products to furnish all the nutritional and other qualities of the yeast, except the zymatic activity which has heretofore been a bar to the use of yeast in such products. The product will also be useful in certain apparently abnormal uses where, by reason of excessive gas formation, it has been deemed impractical to administer yeast directly.

Since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. As a new article of manufacture, a compressed live yeast product substantially normal in other respects but substantially devoid of zymatic activity.

2. As a new article of manufacture, a compressed live yeast product having normal color, odor, taste and reproducing power, and being substantially devoid of zymatic activity.

3. A method of preparing a yeast having depressed zymatic activity which comprises growing the yeast in the presence of ethylene chlorohydrin.

4. A method of preparing a yeast having depressed zymatic activity which comprises growing the yeast in a nutrient solution containing about .01% to .03% of ethylene chlorohydrin.

5. A process of manufacturing yeast which comprises preparing the yeast nutrient solution, adding thereto a live yeast having substantially no zymatic activity, and propagating the yeast in the nutrient solution with aeration.

6. A process of manufacturing yeast which comprises preparing the yeast nutrient solution, adding thereto a live yeast having substantially no zymatic activity, and propagating the yeast in the nutrient solution with aeration until a high yield of yeast having full zymatic activity is obtained.

In testimony whereof we affix our signatures.

ALFRED SCHULTZ.
CHARLES N. FREY.